United States Patent
Yamasaki (10) Patent No.: US 7,664,382 B2
(45) Date of Patent: Feb. 16, 2010

(54) ELECTRONIC BLUR CORRECTION DEVICE AND ELECTRONIC BLUR CORRECTION METHOD

(75) Inventor: Masafumi Yamasaki, Hachioji (JP)

(73) Assignees: Olympus Imaging Corp., Tokyo (JP); Olympus Corporation, Tokyo (JP)

( * ) Notice: Subject to any disclaimer, the term of this patent is extended or adjusted under 35 U.S.C. 154(b) by 409 days.

(21) Appl. No.: 11/713,200

(22) Filed: Mar. 2, 2007

(65) Prior Publication Data

US 2007/0212044 A1    Sep. 13, 2007

(30) Foreign Application Priority Data

Mar. 10, 2006   (JP) ............................... 2006-065489

(51) Int. Cl.
G03B 17/00 (2006.01)
G03B 7/083 (2006.01)
G03B 7/093 (2006.01)
H04N 5/228 (2006.01)
H04N 5/235 (2006.01)

(52) U.S. Cl. ...................... 396/55; 348/246; 348/208.1; 348/208.4; 348/208.6; 348/208.12; 348/229.1

(58) Field of Classification Search .................. 396/55, 396/52, 54, 215, 246; 348/208.99, 208.1, 348/208.4, 208.6, 208.12, 297

See application file for complete search history.

(56) References Cited

U.S. PATENT DOCUMENTS

| 6,778,210 B1 | 8/2004 | Sugahara et al. |
| 2002/0030754 A1 | 3/2002 | Sugimoto et al. |
| 2004/0061796 A1* | 4/2004 | Honda et al. ................ 348/297 |

FOREIGN PATENT DOCUMENTS

| CN | 1344105 | 4/2002 |
| JP | 11-252445 | 9/1999 |
| JP | 2003-259208 | 9/2003 |
| JP | 2004-279514 | 10/2004 |

OTHER PUBLICATIONS

Chinese Office Action for Chinese Patent Application No. 2007100861636, mailed on May 9, 2008 (8 pgs.) (with English Translation (16 pgs.)).

* cited by examiner

*Primary Examiner*—Rochelle-Ann J Blackman
(74) *Attorney, Agent, or Firm*—Straub & Pokotylo; John C. Pokotylo (57) ABSTRACT

In an electronic blur correction device, imaging for a time-division exposure time is repeated m times (m is an integer of 2 or more), captured images are amplified by a factor of m to obtain a plurality of time-divided images, and an image for which blur is corrected is generated from the plurality of time-divided images. Here, the time-division exposure time is an exposure time that is obtained by dividing a proper exposure time by m and is shorter than a blur tolerable limit exposure time.

10 Claims, 8 Drawing Sheets

| D3 | D2 | D1 | GAIN | ISO SENSITIVITY |
|---|---|---|---|---|
| 0 | 0 | 0 | ×1 | 50 |
| 0 | 0 | 1 | ×2 | 100 |
| 0 | 1 | 0 | ×4 | 200 |
| 0 | 1 | 1 | ×8 | 400 |
| 1 | 0 | 0 | ×16 | 800 |
| 1 | 0 | 1 | ×32 | |
| 1 | 1 | 0 | ×64 | |
| 1 | 1 | 1 | ×128 | |

ELECTRONIC BLUR CORRECTION DEVICE AND ELECTRONIC BLUR CORRECTION METHOD

CROSS-REFERENCE TO RELATED APPLICATION

This application is based upon and claims the benefit of priority from prior Japanese Patent Application No. 2006-065489, filed on Mar. 10, 2006, the entire contents of which are incorporated herein by reference.

BACKGROUND OF THE INVENTION

1. Field of the Invention

The present invention relates to an electronic blur correction device and an electronic blur correction method capable of effectively compensating for image blur caused by hand shake and the like. Particularly, the present invention relates to an electronic blur correction device and an electronic blur correction method for compensating for mutual blurring of a plurality of images continuously shot at a blur tolerable exposure time and combining the images for which blur is corrected.

2. Description of the Related Art

It is conventionally known that blur may occur in a shot image due to the influence of photographer's hand movements upon shooting a still image with an imaging apparatus. Therefore, various measures have been taken to prevent this blur problem. For example, Japanese Patent Application Laid-Open No. 11-252445 discloses a technique for reading a plurality of images continuously from an image pickup device to compensate for mutual blurring of the plurality of images and combine the images in order to generate an image for which blur is corrected. In this Japanese Patent Application Laid-Open No. 11-252445, picture signals taken during periods of blur tolerable exposure time (period which time-length is so short that the amount of blur is negligible or allowable) are read from the image pickup device on a frame basis, and when the signal level of the picture signals exceeds a predetermined value, the shooting operation is terminated. During this shooting operation, motion vectors are detected from images and the images are superimposed onto each other to obtain a blur-corrected image.

In the blur correction technique disclosed in Japanese Patent Application Laid-Open No. 11-252445, when an accumulated value of the picture signals, each of which is taken during a period of fixed time-division exposure time, exceeds a predetermined value, the time-division exposure is completed. Therefore, in order to obtain the optimum exposure, the number of imaging times needs to be determined up to required digits after the decimal point and the imaging needs to be performed the determined number of times. In other words, when the optimum exposure time is set as Texp and the blur tolerable time-division exposure time is set as TLimit, a time-division image capturing of TLimit exposure time should be performed the number of times, m, where m=Texp/TLimit. And these images captured during the periods of the time-division exposure time are compensated for mutual image blurring and combined together, thereby making it possible to obtain an image without blur at the optimum exposure level.

However, the number of exposure times, m, is not an integer in the majority of cases. In such cases, when the fractional part of m is represented as k, the imaging for the exposure time TLimit needs to be performed (m−k) times and once for exposure time k×TLimit. After that, these images are compensated for mutual blurring and combined (added) together.

BRIEF SUMMARY OF THE INVENTION

The electronic blur correction device of the present invention repeats an imaging for a time-division exposure time m times (m is an integer of 2 or larger), amplifies the captured images by a factor of m to obtain a plurality of time-divided images, and generates an image for which blur is corrected from the plurality of time-divided images. Here, the time-division exposure period is obtained by dividing the proper exposure time by m and is shorter than a blur tolerable limit exposure time.

An exemplary structure of the electronic blur correction device of the present invention can be expressed as follows. An electronic blur correction device comprising: an exposure time computing part for computing an exposure time; a time-division exposure time computing part for computing a time-division exposure time that is shorter than a predetermined blur tolerable limit exposure time and is 1/m (m is an integer) of the exposure time; a time-division imaging part for performing time-division imaging plural times in the time-division exposure time; a first amplifier part for amplifying an image captured by the time-division imaging part by a factor of m; a blur compensation part for compensating for mutual blurring of a plurality of time-divided images amplified by the factor of m; and an image synthesis part for combining the plurality of time-divided images the mutual blurring of which are compensated for by the blur compensation part.

The present invention can also be understood as the invention of an electronic blur correction method.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

A preferred embodiment of the invention is described below with reference to the accompanying drawings.

Using a digital camera having features as an electronic imaging apparatus to which the present invention is applied, a preferred embodiment of the present invention will be described below with reference to the accompanying drawings.

Figure 1:
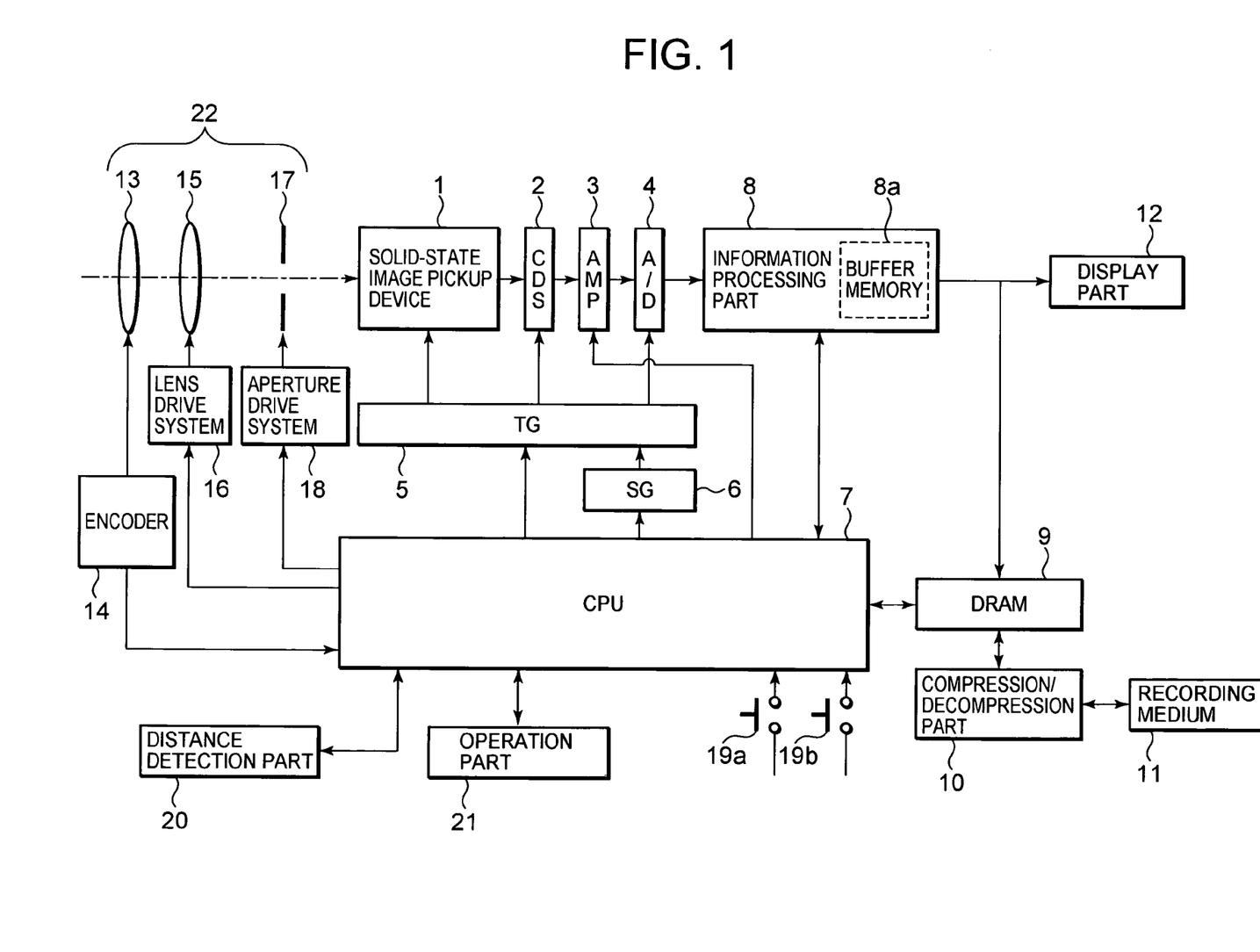
FIG. 1 is a block diagram showing an electric system of a digital camera according to a preferred embodiment to which the present invention is applied.

FIG. 1 is a block diagram primarily showing the electric structure of a digital camera according to the embodiment. This digital camera includes a two-dimensional solid-state image pickup device (which may be generically referred to as "image pickup device" below) 1, a correlated double sampling (CDS) circuit 2, a gain control amplifier (AMP) 3, an A/D converter 4, a timing generator (TG) 5, a signal generator (SG) 6, and a CPU (Central Processing Unit) 7. Further, the digital camera includes an information processing part 8, a DRAM (Dynamic Random Access Memory) 9, a compression/decompression part 10, a recording medium 11, a display part 12, a variator lens 13, an encoder 14, a focus lens 15, a focus lens drive system 16, an aperture 17, an aperture drive system 18, a first release switch 19a and a second release switch 19b, a distance detection part 20, and an operation part 21. The variator lens 13, the encoder 14, the focus lens 15, the focus lens drive system 16, the aperture 17, and the aperture drive system 18 constitute a photographing lens 22.

The variator lens 13 in the photographing lens 22 is an optical system for setting a focal length. The encoder 14 is to detect a position signal corresponding to the focal length of the variator lens 13. The detected position signal is read by the CPU 7 and converted to a focal length of the photographing lens 22. The focus lens 15 is a lens for focusing on a subject. The focus lens 15 is adjusted according to the subject distance detected by the distance detection part 20 so that a desired subject will be in focus. The focus lens drive system 16 drives the photographing lens 22 to an in-focus position in accordance with an instruction from the CPU based on the subject distance information detected by the distance detection part 20. This is a known technique as so-called autofocus control.

The subject distance detection part 20 is to detect information related to the distance to the subject. The subject distance detection part 20 extracts high frequency components using a high-pass filter or the like from luminance components of image data for one frame (one screen) stored in the DRAM 9 to calculate an AF evaluated value corresponding to contour components or the like on the high-frequency side by calculating a cumulative composite value of the extracted high frequency components or the like in order to perform focus detection based on this AF evaluated value. These computations can be performed by the CPU 7. The subject distance detection part 20 uses the above-mentioned detection method based on the high frequency components of image data, but this method can, of course, be replaced with any of various known detection method such as a phase difference method or a light projection method.

The aperture 17 arranged in the photographing lens 22 is an optical aperture for regulating the passing range of an imaging light beam from the photographing lens 22 to adjust the amount of light. The aperture 17 is part of an imaging optical system, and is driven by the aperture drive system 18 based on a control signal from the CPU 7. The CPU 7 partly serving as a photometric part performs exposure computation based on image data stored in the DRAM 9, and the aperture drive system 18 receives a control instruction from the CPU 7 based on the exposure computation result to drive the aperture 17 in order to change the aperture diameter. Such aperture control is known as so-called AE (automatic exposure) control.

Figure 2:
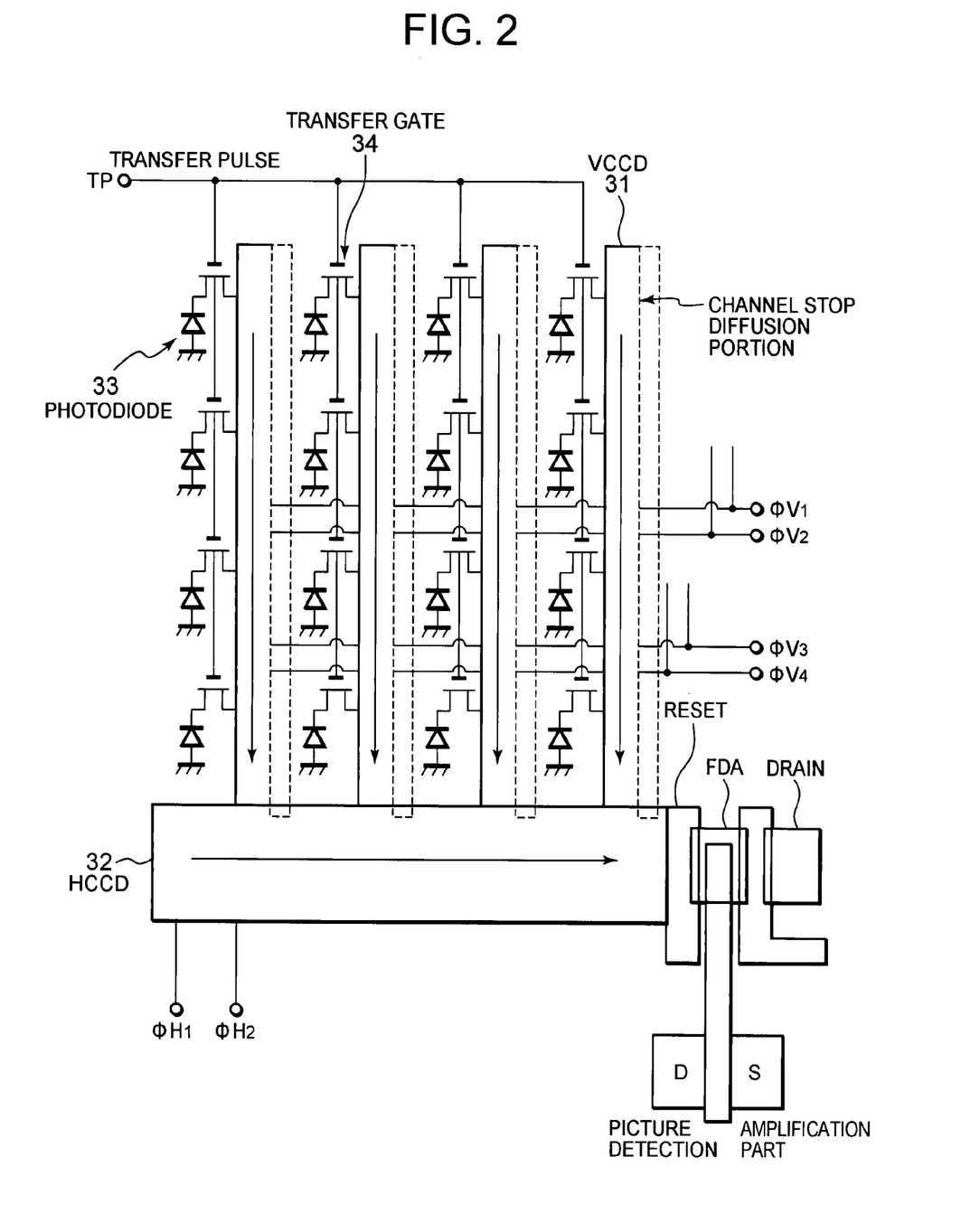
FIG. 2 is a diagram showing the structure of an image pickup device 1 of the embodiment.

The subject beam that has passed through photographing lens 22 produces an image on the image pickup device 1 in which the subject image is captured, photoelectrically converted and output as an analog electric signal. FIG. 2 shows the structure of the image pickup device 1. This image pickup device 1 is a known interline CCD type solid-state image pickup device. In this image pickup device 1, each of vertical transfer CCDs (VCDDs) 31 is arranged as a set with each of linear arrays of photodiodes 33. Then, the VCDDs 31 are connected to a horizontal transfer CCD (HCCD) 32 arranged in a lower portion of the image pickup device. Signal charges photoelectrically converted at the photodiodes 33 are accumulated in their junction capacitances, respectively. Then, upon completion of the accumulation time (exposure period), a shift pulse is applied to each of transfer gates (TP) 34, so that these electric charges for all pixels are shifted to the adjacent VCCDs 31. After the signal charges are read, the photodiodes 33 return to a biased state in which accumulation of signal charges is possible. The signal charges read out to the VCCDs 31 are transferred downward in sync with a clock pulse applied to each of transfer electrodes of the VCCDs 31. When transferred to the undermost end, the signal charges are transferred to the HCCD 32 line by line from the VCCDs 31 and sequentially to the output terminals of the HCCD 32. Then, when the signal charges for one screen are read out, the VCCDs 31 become an empty state in which reading of signal charges accumulated in the photodiodes 33 for the next accumulation time is possible.

For the image pickup device 1, a CCD type solid-state image pickup device having a known vertical overflow structure is adopted. In this structure, the photodiodes (PDs) 33 are formed in p-type diffusion regions (p-wells) formed in the surface of an n-type substrate (for example, an n-type silicon substrate) in such a manner that the p-wells will be fully depleted at a reverse bias voltage VSUB between the p-wells and the n-type substrate. Then, a high-voltage pulse is applied to this VSUB to enable discharge of the electric charges accumulated in the photodiodes 33 to the substrate side. This control of the reverse bias voltage VSUB enables control of the accumulation time of electric charges of the photodiodes 33. In the embodiment, although the interline CCD type solid-state image pickup device is adopted for the image pickup device 1, the present invention is not necessarily limited thereto. For example, the image pickup device 1 can be a frame interline transfer type solid-state image pickup device, or it can, of course, be an MOS (Metal Oxide Semiconductor) type solid-state image pickup device.

Returning to FIG. 1, the timing generator (TG) 5 connected to the image pickup device 1 receives a pulse from the CPU 7 to supply a transfer pulse for driving the image pickup device 1 while supplying various pulses to the CDS 2 and the A/D converter 4 to be described later. The pulse is directly input into the TG 5 from the CPU 7, and is also connected to the signal generator (SG) 6. This SG 6 generates a sync signal under the control of the CPU 7 and outputs the sync signal to the TG 5.

The CDS 2 connected to the output of the image pickup device 1 is driven according to a sample-hold pulse supplied from the TG 5 to perform processing such as correlated double sampling on image signals output from the image pickup device 1 in order to remove reset noise. The gain control amplifier (AMP) 3 connected to the output of the CDS 2 amplifies analog signals output from the CDS 2. The gain of this AMP 3 is set to a gain according to the ISO (International Organization for Standardization) sensitivity Sv. In other words, the AMP 3 is an ISO sensitivity changing part. The gain of the AMP 3 is also used to amplify a combined image in order to cover a shortfall when the number of images captured in a time-division manner does not reach a specified number. Although the details will be described later, if a slower shutter speed is required to lengthen the exposure time due to some circumstances such as low subject brightness, the resulting image can blur under the influence of camera shake or the like. In the embodiment, time-division exposure for a blur tolerable limit exposure time is repeated to obtain optimum exposure while combining a plurality of images obtained during the time-division exposure to eliminate the effects of blur. Upon performing the time-division exposure, since the level of image signals for one frame is reduced, the AMP 3 amplifies the combined image to cover the shortfall.

Figure 3:
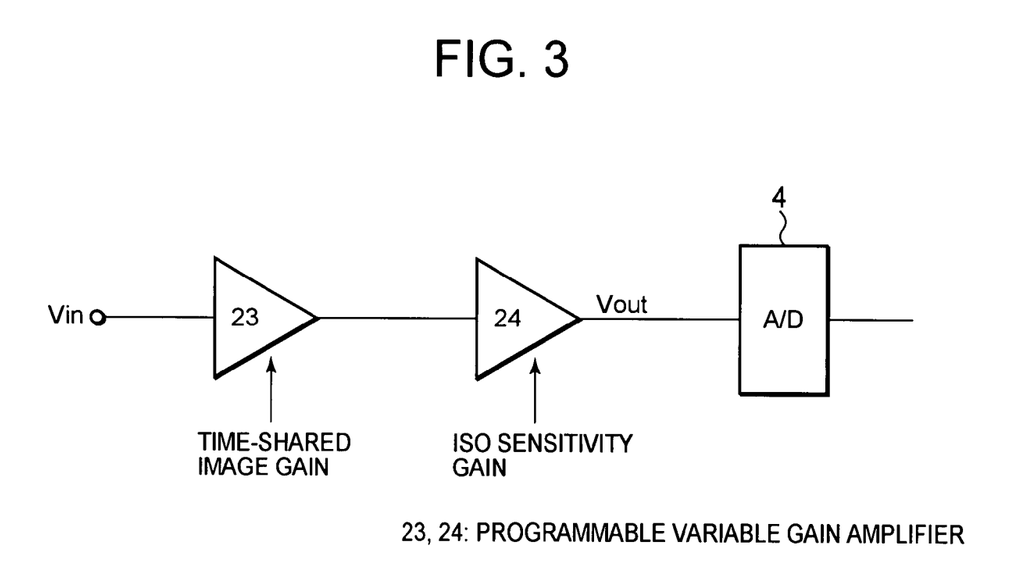
FIG. 3 is a block diagram showing the details of a gain control amplifier AMP of the embodiment.

FIG. 3 shows the structure of the AMP 3. The output of the CDS 2 for removing reset noise is connected to an amplifier 23 having gain A1 as the first stage of the AMP 3. The output of this amplifier 23 is connected to an amplifier 24 having gain A2. The output of the amplifier 24 is connected to the A/D converter 4 to be described later. The gain A1 is to set a value to cover an insufficient amount of exposure in the time-division exposure, and the gain A2 is to set a gain according to the ISO sensitivity.

Returning to FIG. 1, the A/D converter 4 connected to the output of the AMP 3 is an analog/digital conversion part for converting an analog signal output from the AMP 3 to a digital signal according to the signal supplied from the timing generator (TG) 5. The information processing part 8 connected to the output of this A/D converter 4 processes a digital pixel signal output from the A/D converter 4 to generate image data. This information processing part 8 has a buffer memory 8a for temporary storage of a plurality of image data (time-divided image data) captured by the image pickup device 1 and processed therein.

The DRAM 9 connected to the output of the information processing part 8 is a memory for temporary storage of image data output from the information processing part 8 and image data output from the compression/decompression part 10. Note that the buffer memory 8a can also serve as the DRAM, or the DRAM 9 can also serve as the buffer memory 8a. The compression/decompression part 10 connected to the DRAM 9 performs compression according to a compression format such as JPEG (Joint Photographic Coding Experts Group) upon recording image data temporarily stored in the DRAM 9 onto the recording medium 11, and decompression on compressed image data read from the recording medium 11.

The recording medium 11 connected to the compression/decompression part 10 is a recording part for recording image data compressed by the compression/decompression part 10. The recording medium 11 can be, for example, a rewritable nonvolatile recording medium to be removably loaded into the camera body, such as an xD-Picture Card™, a Compact Flash™, an SD Memory Card™, or a Memory Stick™. The display part 12 connected to the information processing part 8 and the DRAM 9 is a monitor for displaying image data output from the information processing part 8 and the DRAM 9. The image data are compressed to reduce the amount of recording space on the recording medium 11, and the compressed image data are decompressed when being displayed on the display part 12.

The first release switch 19a and the second release switch 19b, both connected to the CPU 7, are configured as automatic reset type two-step switches. When a release button (not shown) is pressed, the first release switch 19a is turned on, and when the release button is further pressed, the second release switch 19b is turned on. In other words, when the release button is pressed halfway, the first release switch 19a is turned on, while when the release button is fully pressed, the second release switch 19b is turned on. The first release switch 19a is to input an instruction to start shooting preparation operations. Therefore, when the first release switch 19a is turned on, distance measurement and light metering operations are performed. On the other hand, the second release switch 19b is to input an instruction to start a shooting operation. Therefore, when the second release switch 19b is turned on, the image pickup device 1 performs an imaging operation to generate image data in the manner as mentioned above. Then, the image data is compressed and recorded on the recording medium 11. The operation part 21 connected to the CPU 7 is an operation part for setting various shooting conditions, such as a shooting mode, a shutter speed value, an aperture value, etc., based on photographer's operations.

As mentioned above, signals from the first release switch 19a, the second release switch 19b, the encoder 14, the operation part 21, etc. are input into the CPU 7, and the CPU 7 outputs instructions to the TG 5, the SG 6, etc. The CPU 7 also outputs control signals to the focus lens drive system 16, the aperture drive system 18, the AMP 3, and the TG 5, respectively. Further, the CPU 7 are bi-directionally connected to the information processing part 8, the DRAM 9, and the distance detection part 20 to control the entire operation of the digital camera including these components. Specifically, the CPU 7 performs the above-mentioned autofocus control and AE control, and controls the driving of the image pickup device 1 based on the signals from the first release switch 19a and the second release switch 19b to instruct capturing of a still image. Further, the CPU 7 performs aperture control to change the opening size of the aperture 17 and exposure time control of the image pickup device 1. Then, based on the output from the operation part 21, the CPU 7 sets a shooting mode of this digital camera and shooting conditions for the digital camera.

Referring next to flowcharts shown in FIGS. 4 to 6, the operation of the digital camera of the embodiment will be described. These flowcharts are executed under the control of the CPU 7.

When the operation of the digital camera is started, it is first determined in step S101 whether the first release switch 19a has been turned on. As a result of determination, if the first release switch 19a is off-state, the digital camera enters a waiting state. Then, when the first release switch 19a is turned on, the procedure goes to step S102 to compute a blur limit exposure time TLimit. This blur limit exposure time TLimit is a time period where the amount of image blur since the start of exposure supposedly reaches the blur tolerance limit.

The following describes about the blur limit exposure time TLimit. In case of the 35 mm film camera, a film having a frame size of 24 mm wide and 36 mm long (43.28 mm diagonal), so-called Leica frame (also known as "double frame"), is used. As the rules of thumb gained from long experience about the 35 mm film camera, it is known that if the focal length of the photographing lens in millimeters is f, the blur limit exposure time TLimit is $$TLimit \approx 1/f (seconds) \quad (1)$$

Here, "≈" means almost equal to. In the embodiment, this empirical rule is applied as well as the consideration of the size of a shooting frame, which is set within an effective imaging area of the image pickup device 1 of the digital camera. In other words, since the focal length value of the digital camera is typically represented as equivalent to that of the 35 mm film camera, the focal length equivalent to that of the 35 mm camera is used here.

Returning to FIG. 4, the inverse of the focal length f detected by the encoder 14 is calculated in step S102. Note here that the blur limit exposure time TLimit is not necessarily the value given by 1/f, and any other time-division exposure time short enough not to substantially contain any image blur can be used. It means that any other blur limit exposure time TLimit can be used as long as it is shorter than the exposure time given by the above equation (1).

Then, in step S103, the brightness of the subject is measured. In this light metering operation, the brightness of the subject is computed by monitoring the level of image signals repeatedly output from the image pickup device 1. In other words, the image signals read from the image pickup device 1 are processed by the CDS 2, amplified by the gain control amplifier 3, converted to digital values by the A/D converter 4, and stored temporarily in the DRAM 9 via the information processing part 8. Out of the image data stored in this DRAM 9, a predetermined area of the image data, for example, in the vicinity of the center of the entire image is read by the CPU 7 to determine a combined average value of the level in order to compute the brightness (Bv) of the subject based on the obtained combined average value.

After completion of light metering, the CPU 7 computes the shutter speed value (exposure time) Texp required to obtain optimum exposure from an APEX operation to calculate <Texp/Tlimit> and store the calculation result in a given memory (S104). Here, <x> is an integral value to which the fractional part of number x is rounded up, and Texp is a normal shooting exposure time. Thus, the calculation result of <Texp/Tlimit> becomes an integral value m obtained by rounding up the fractional part, and [m] means a memory for storing this integral value m. Note that the APEX operation is a known exposure value computation. If the APEX values for shutter speed, aperture, subject brightness, and ISO sensitivity are Tv, Av, Bv, and Sv, respectively, each of the exposure parameters can be determined from the following relationship:

$$Tv+Av=Bv+Sv \quad (2)$$

In the embodiment, although <x> is an integral value to which number x is rounded up, it can be any integral value to which number x is rounded off or rounding down, or the nearest integral value can be selected from predetermined integral values as in an alternative example of the embodiment to be described later. In any case, the integral value can be a value close to the value obtained as a result of calculation <Texp/Tlimit>. Further, although the shutter speed Texp is determined to obtain the optimum exposure based on the light metering results, the present invention is not limited thereto, and the photographer can, of course, manually set a shutter speed.

Returning to FIG. 4, the procedure goes to step S105 to determine time-division exposure time ΔTexp by dividing the exposure time Texp by the integral value m. The resulting value is stored in a given memory. In the embodiment, the integral value m is determined based on the result of the Texp/Tlimit calculation to divide the exposure time Texp by this integral value m, thus obtaining the time-division exposure time ΔTexp. Therefore, exposure with constant exposure time ΔTexp is performed m times during one-time imaging. Thus, since each of the exposure time periods is constant, the S/N of each exposure can also be constant and suitable for practical use. On the other hand, as in the conventional technique, if Tlimit is set to a simply calculated time-division exposure time, there is need to make an extra exposure for the fraction after the decimal point corresponding to a difference between Texp and m×Tlimit. In this case of the prior art, this extra exposure time is short, and this causes a problem that the S/N is degraded. In the embodiment, this problem is improved.

Figure 4:
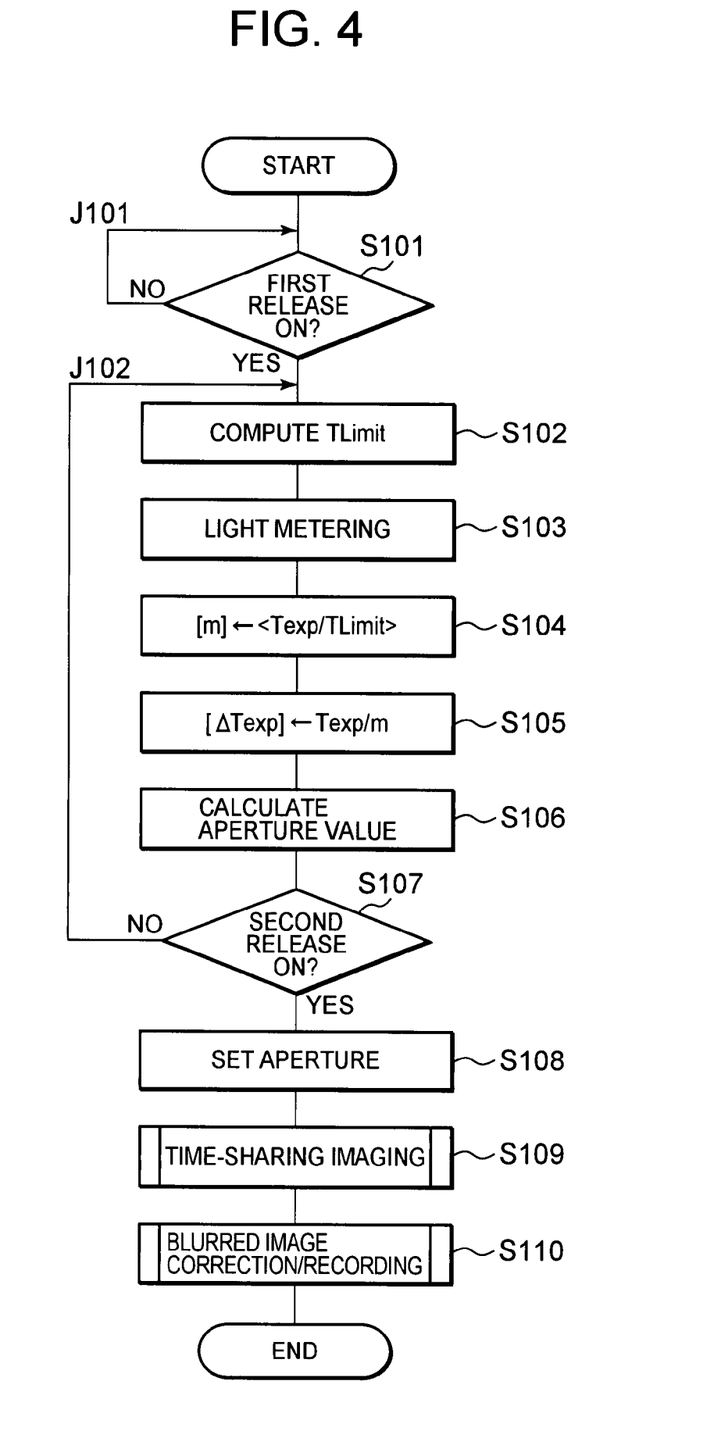
FIG. 4 is a main flowchart showing the operation of the digital camera of the embodiment.

Then, in the flowchart of FIG. 4, an aperture value is calculated based on the APEX operation (S106). Note here that the subject brightness value on the right side of the equation (2) is a value determined by light metering in step S103, and the ISO sensitivity value is a default value or a value entered by the photographer via the operation part 21. Therefore, Tv and Av on the right side of the equation (2) are computed as appropriate along a predetermined program line.

Then, it is determined whether the second release switch 19b is on-state (S107). When the second release switch 19b is off-state, the procedure is diverged to J102 to repeat the above-mentioned steps S102 to S106 and wait until the second release switch 19b is turned on. During this waiting period, if the first release switch 19a is also turned off, the procedure returns to step S101.

In step S107, when the second release switch 19b is turned on, the procedure goes to step S108 in which an aperture value is set to start the imaging operation. Here, since the aperture 17 is in its maximum open state, the aperture drive system 18 is controlled to narrow the aperture to an aperture value obtained in step S106. Then, the procedure goes to step S109 to perform time-division imaging m times.

Figure 7:
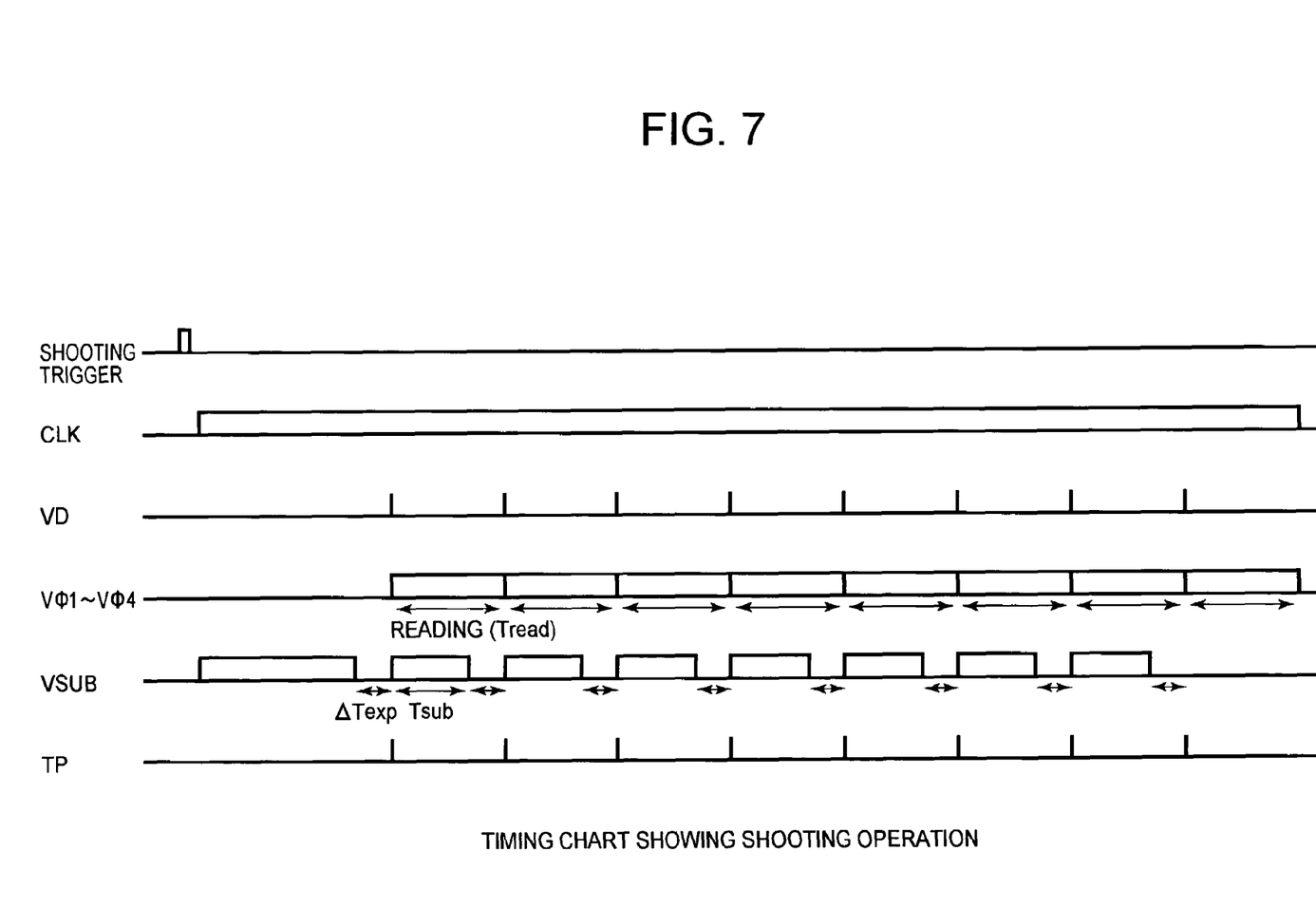
FIG. 7 is a timing chart showing a shooting operation of the digital camera of the embodiment.

Referring to a timing chart shown in FIG. 7, this time-division imaging will be described below. At the falling edge of a pulse of a shooting trigger signal (from the second release switch 19b), a clock signal CLK is supplied from the timing generator (TG) 5 to the image pickup device 1. Upon receipt of the clock signal CLK, a substrate-applied high-voltage pulse VSUB is repeatedly applied to forcibly discharge the electric charges accumulated in the photodiodes 33, which form pixels of the image pickup device 1, to the semiconductor substrate (vertical overflow drain VOD). Upon completion of the application of this high-voltage pulse VSUB, exposure is started. In other words, the image pickup device 1 starts exposure in synch with the falling edge of the high-voltage pulse VSUB. After the exposure time ΔTexp determined in step S105 has elapsed from the falling of the high-voltage pulse VSUB, a shift pulse TP is output to shift the electric charges accumulated in the photodiodes 33 of the image pickup device 1 to the vertical transfer CCDs (VCCDs) 31. Then, the accumulated electric charges are read out as image signals in sync with a vertical sync signal VD, and in sync with the start of reading of the image signals, the high-voltage pulse VSUB rises again and is applied to the image pickup device 1 for a predetermined period of time. After completion of application of the high-voltage pulse VSUB, exposure is started again, and reading of an image by the second time-division imaging is performed in sync with the next vertical sync signal VD. The above-mentioned sequence of operations are repeated m times (for example, ten times). As is apparent from the above description, the exposure time ΔTexp for the time-division imaging corresponds to the time obtained by subtracting the application time Tsub of the high-voltage applied pulse VSUB from the time period between the start of reading and the next start of reading, i.e., from the reading time Tread.

Thus, time-divided analog signals are read out from the image pickup device 1 in a time-division manner, and reset noise is removed by the CDS 2 from the time-divided analog signals. Then, the time-divided analog signals are amplified in an analog manner by the gain control amplifier (AMP) 3. Assuming that a gain for compensating for insufficient image exposure due to time-division imaging is A1 and a gain corresponding to the ISO sensitivity Sv is A2, the gain of this AMP 3 is set to A1×A2. Here, if the normal shooting exposure amount is E1 and the time-division imaging exposure amount is E2, A1=E1/E2. To be more specific, assuming that the time-division imaging is performed m times, each with exposure time Texp/m(=ΔTexp) obtained by equally dividing, by m, the exposure time Texp for obtaining optimum exposure, the gain in each time-division imaging is $$A1=Texp/(Texp/m)=m \quad (3)$$

In the gain control amplifier (AMP) 3 shown in FIG. 3, there are separately provided the amplifier 23 having gain A1 for m-fold amplification of the output signal from the CDS 2 according to the number of time-division imaging times, m, and the amplifier 24 having gain A2 for amplification of the output signal from the CDS 2 according to the ISO sensitivity. These amplifiers are connected in series. In such a structure, any gain can be set easily by multiplying the gain of the amplifier 23 and the gain of the amplifier 24 together.

The analog image signals amplified by the gain control amplifier (AMP) 3 are converted by the A/D converter 4 into digital signals according to the signal supplied from the timing generator 5. The image signals converted by the A/D converter 4 into the digital signals undergo predetermined image processing in the information processing part 8, and stored in the buffer memory 8a inside the information processing part.

As described above, time-division imaging is performed with an exposure time that is 1/m of the exposure time Texp (where m is an integer). Then, the resulting image signals are amplified by a factor of m in the gain control amplifier (AMP) 3 and A/D converted. Therefore, digital image signals with substantially the same optimum level as in normal shooting can be obtained. Since the time-division imaging is performed m times and the resulting image signals are compensated for blurring and combined (added) together in a manner to be described later, an image with improved S/N and blurring corrected can be generated. As is apparent from the above description, the number of time-division imaging times needs not to be m. The more the number of time-division imaging times, the more the S/N of the combined image is improved.

Further, in the embodiment, imaging is performed at every time-division exposure time ΔTexp obtained by dividing the exposure time Texp by the integer m. In other words, the time-division exposure time can vary according to the exposure time Texp and imaging is performed m times, thereby making it possible to obtain optimum exposure. The gain of the amplifier can also be set as an integral number, and this simplifies the structure.

Returning to FIG. 4, after completion of the time-division imaging (S109), the procedure goes to step S110 to execute a blurred image correction/recording subroutine in which a combined image with blurring corrected is generated and recorded on the recording medium 11. This subroutine will be described with reference to the flowcharts of FIGS. 5 and 6. First, mutual blurring compensation for compensating for mutual blurring of images obtained from m time-division exposures and stored in the buffer memory 8a, and blurred image correction for generating a combined image from these mutually blur-compensated images are performed (S201).

Here, a flow of blurred image correction performed by the information processing part 8 in this blurred image correction subroutine will be described with reference to FIG. 6.

First, as an initial setting, 0 is stored in memory [i] for storing variable i corresponding to ID for identifying each divided image (S301). Then, relative blur Δ(i, i+1) between image I(i) and image I(i+1) is computed (S302). The blur Δ can be determined by setting several characteristic points of the image I(i) by determining the positions of characteristic points of the image I(i+1) corresponding to the characteristic points of the image I(i) by a known motion vector calculation technique, and determining relative displacement between these corresponding positions. The blur Δ is a vector.

Next, the procedure goes to step S303 to compute a scalar value |ΣΔ(k, k+1)| of ΣΔ(k, k+1) (where k=0–i) of the integrated blur Δ and compare this value with a predetermined value α. As a result of comparison, if not |ΣΔ(k, k+1)|>α, i.e., when the integrated value of blur is smaller than the predetermined value but the blur is not so significant, blur correction is possible. In this case, the procedure goes to step S304 to increment the content of the memory [i] by one. Then, relative blur between the image I(i) and the image I(i+1) is compensated for based on the blur Δ, and corresponding pixel values are added (combined) (S305). After that, in step S306, i and m−1 are compared, where m is the number of time-division imaging times set in step 104 (FIG. 4), i.e., the number of images obtained by the time-division imaging, and m−1 is the number of times the blur compensation processing is performed. As a result of the comparison, if not i=m−1, the procedure is diverged to J301 to return to step S302 to repeat the above-mentioned processing. On the other hand, as a result of comparison, if i=m−1, the procedure goes to step S307 to compute an average value of the images compensated for mutual blurring and combined together, thereby obtaining an image after subjected to blur compensation processing.

On the other hand, as a result of determination in step S303, if |ΣΔ(k, k+1)|>α, the total amount of blur during the time-division imaging is determined to be larger than a tolerable value, i.e., a value at which it is difficult to secure sufficient effective areas, and the procedure is diverged to J302 to shift to step S307. In this case, the blur compensation processing is not performed, resulting in a blurred image.

Figure 5:
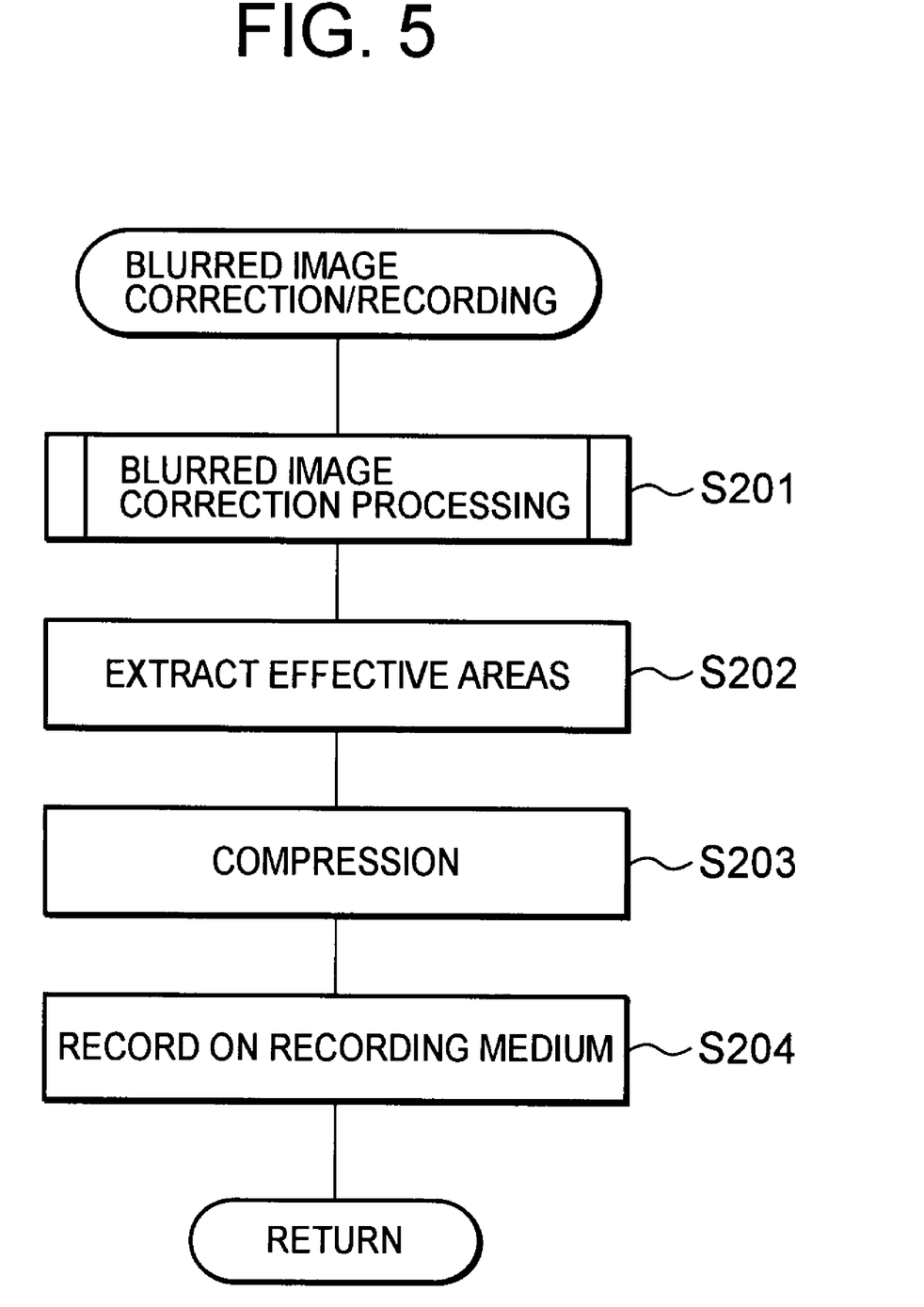
FIG. 5 is a flowchart showing blurred image correction and recording in the digital camera of the embodiment.
Figure 6:
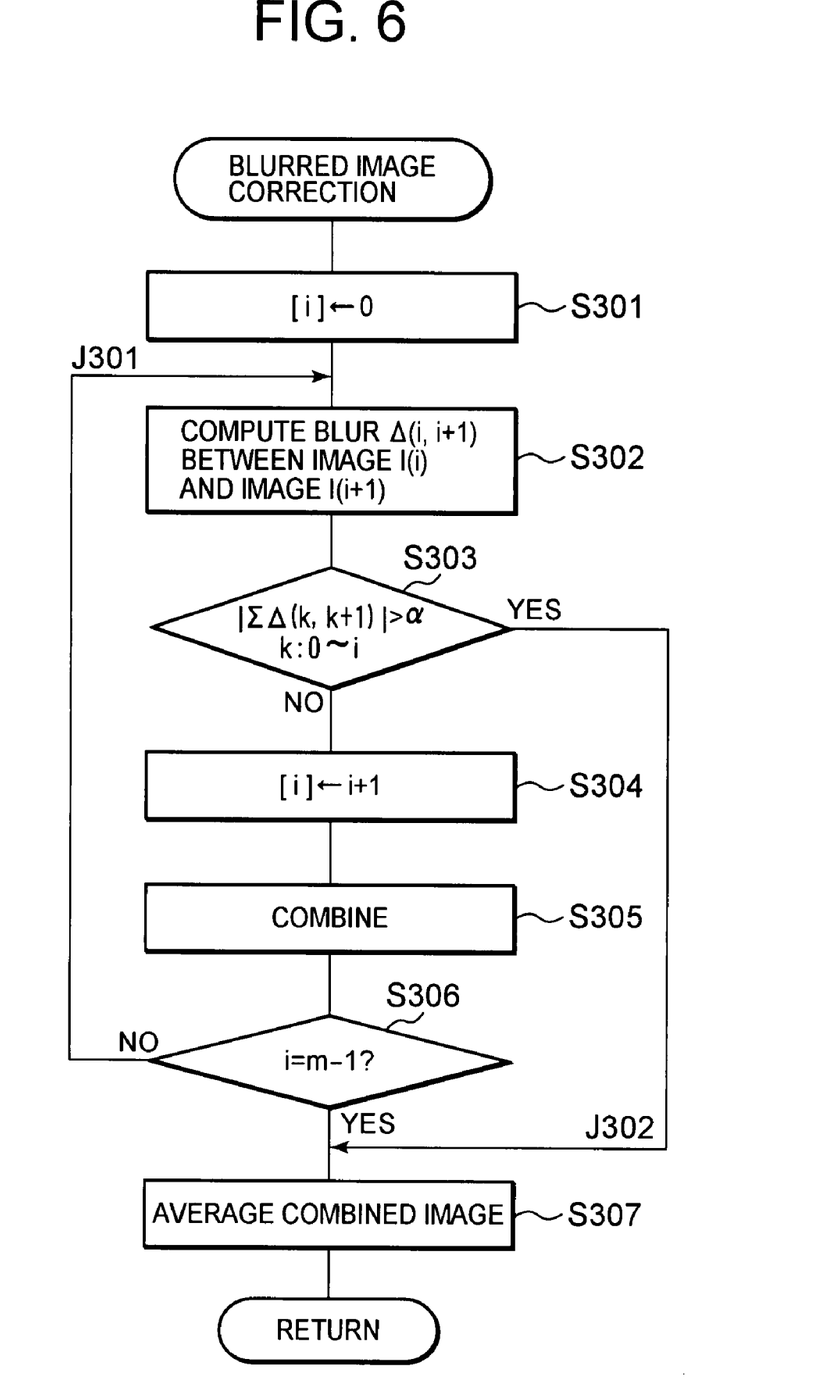
FIG. 6 is a flowchart showing the operation of a blurred image correction subroutine in the digital camera of the embodiment.

After completion of averaging of the combined image in step S307, the blurred image correction subroutine is completed, and the procedure returns to the blurred image correction/recording routine shown in FIG. 5. Then, in step S202, effective areas are extracted. In the information processing part 8, time-divided images having blur amounts equal to or larger than a predetermined amount with respect to the blur amount of the first captured time-divided image are excluded from combining targets so that overlapping areas of all the remaining time-divided images will fall within a predetermined range of effective areas. Then, from among the time-divided images having blur amounts within the predetermined range, images within a predetermined range with respect to the first captured time-divided image in the combined images are extracted. This makes it easy to extract effective areas equal to or more than the predetermined range.

Next, the procedure goes to step S203 to temporarily store the effective areas of image data in the DRAM 9. Then, the temporarily stored image data is compressed into image data in a predetermined format such as JPEG by means of the compression/decompression part 10. Then, in step S204, the compressed image data is recorded on the recording medium 11, and the blurred image correction/recording routine is completed.

The following describes an alternative example of the gain control amplifier (AMP) 3 in the embodiment. The AMP 3 in the embodiment includes the amplifier 23 having gain A1 and the amplifier 24 having gain A2, both provided separately and connected in series, to set the gain A1 according to the number of time-division imaging times and the gain A2 according to the ISO sensitivity, respectively, thereby making it possible to easily obtain any gain. In this structure, however, the circuit structure is complicated. Further, the amplifiers are connected in two stages and this could increase noise. Since the gain A1 of the amplifier 23 and the gain A2 of the amplifier 24 are interrelated so that A1×A2 can take on almost constant values, it is possible to combine the amplifier 23 and the amplifier 24 as one unit. The following describes this point in detail.

When the gain of the amplifier 24 is multiplied by k to multiple the ISO sensitivity by k (=logm/log2 [stage]), the shutter speed becomes 1/k (Texp/k sec.). Therefore, the number of time-division exposure times m' becomes m'=(Texp/k)/TLimit=(Texp/TLimit)/k=m/k (where Texp/TLimit is equal to the number of time-division exposure times before multiplying the ISO sensitivity by k).

In the meantime, since the signal level of the time-divided images becomes 1/m' of the optimum level, it is desired to amplify the time-divided images by a factor of m' before A/D converted to digital signals in order to reduce the quantization noise of the A/D converter 4 to almost the same level as in normal shooting. Then, the plurality of analog-to-digital converted, time-divided images are compensated for mutual blurring, and the plurality of blur-compensated, time-divided images are combined. After that, this combined image is averaged to create a blur-compensated, combined image. Thus, the gain in the conversion of the time-divided images becomes m'/m=1/k. Then, the total gain of the image signals before A/D conversion becomes a value obtained by multiplying the gain of the time-divided images and the gain based on the ISO sensitivity.

Therefore, the variation in total gain before and after changing the ISO sensitivity is equal to k×1/k=1 obtained by multiplying the gain variation k based on the change in ISO sensitivity and gain variation 1/k across the time-divided images. This means that the total gain is kept constant even if the ISO sensitivity is changed, indicating that a single amplifier circuit can be shard as the amplifier circuit for setting the ISO sensitivity and the amplifier circuit for amplifying the time-divided images.

Figure 8:
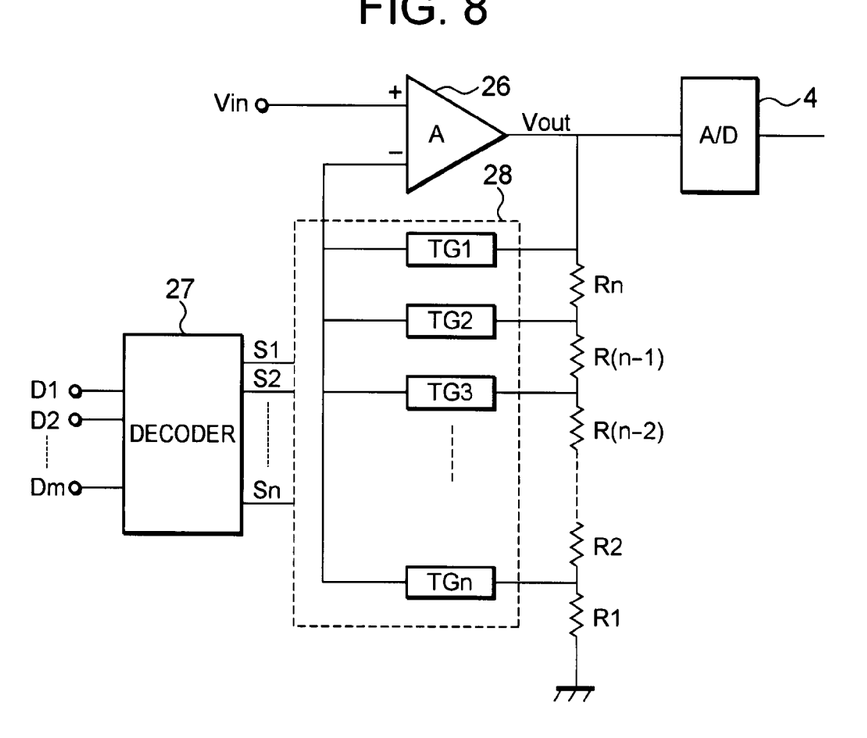
FIG. 8 is a block diagram showing an alternative example of the gain control amplifier AMP in the digital camera of the embodiment.

FIG. 8 shows an alternative example in which a single amplifier serves as both the amplifier 23 and the amplifier. The non-inverting input of a differential amplifier 26 is connected to the output of the CDS 2, while the inverting input is connected to one end of an analog switch circuit 28. The analog switch circuit 28 has n analog switches TG1, TG2, ..., TGn, one end of each of which is connected to the inverting input of the differential amplifier 26 as mentioned above, with the other end connected to each connection point between series-connected resistors Rn, R(n−1), R(n−2), ... R2, R1. In other words, the other end of the analog switch TGn is connected to a connection point between the resistor R1 and the resistor R2, the other end of the analog switch TG2 is connected to a connection point between the resistor R(n−1) and the resistor Rn, and the other end of the analog switch TG1 is connected to a connection point between the resistor Rn and the output of the differential amplifier 26. The other end of the resistor R1 is grounded, and the output of the differential amplifier 26 is also connected to the A/D converter 4.

Each control terminal of the analog switch 28 is connected to each output of a decoder 27, respectively. The decoder 27 is to convert binary input signals D1, D2, ..., Dm into output signals S1, S2, ..., Sn. When this Sx (x=1, 2, 3, ..., n) is "1" ("H" level), it is set that the analog switch TGx (x=1, 2, 3, ..., n) is on-state. If a value resulting from converting a signal made of each input signal D1, D2, ..., Dm into a decimal value is, for example, x, only the output signal Sx among the output signals S1, S2, ..., Sn from the decoder 27 becomes "1" and the other output signals are all "0." For example, if the analog switch TGn is turned on, the output Vout of the differential amplifier 26 is $$Vout = Vin \cdot (Rn + R(n-1) + R(n-2) + \ldots R2 + R1)/R1$$

Figure 9:
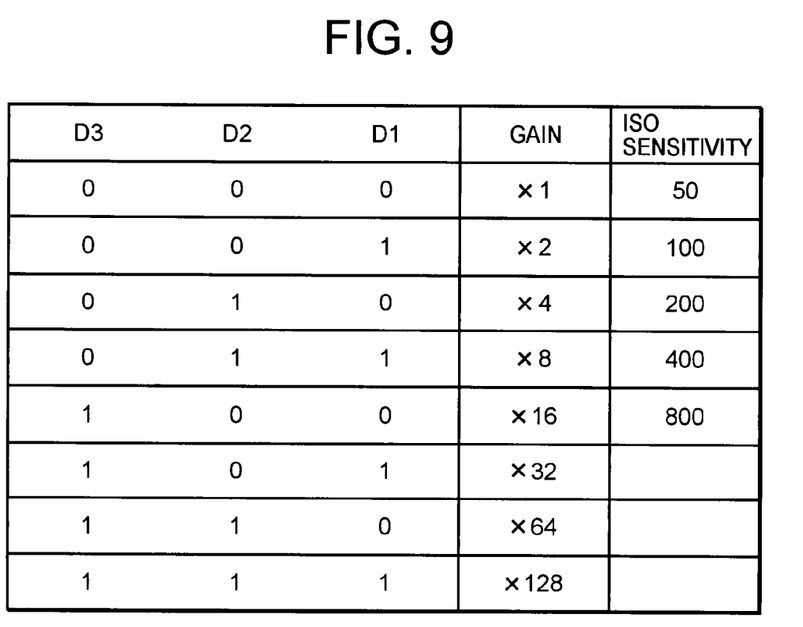
FIG. 9 is a table showing the relationship among input signal, ISO sensitivity, and gain in the gain control amplifier AMP of the digital camera of the embodiment.

As an example, if m=3, n=8, R1=100Ω, R3=200Ω, R4=400Ω, R5=800Ω, R6=1.6 kΩ, R7=3.2 kΩ, R8=6.4 kΩ, gains as shown in FIG. 9 are obtained for the input signals D1, D2, and D3.

Suppose that the gain and the ISO sensitivity are associated with each other as shown in FIG. 9. In this case, when the gain is ×32 or more, there is no associated ISO sensitivity. This is because amplification is made according to the number of time-division imaging times, m. In the example of FIG. 9, the gain A1 for compensating for insufficient image exposure due to time-division imaging needs to be changed in multiples of 2. Therefore, in this example, the number of time division is set, for example, any one of 1, 2, 4, and 8. Specifically, the number of time-division imaging times, m, is determined as follows: First, assuming that the normal shooting exposure time is Texp, Texp/TLimit is computed by dividing Texp by the blur limit exposure time TLimit. Next, a value larger than Texp/TLimit and the smallest in 1, 2, 4, and 8 is selected. For example, if Texp/TLimit=2.55, the number of time-division imaging times, m, is 4. Therefore, in this case, since the gain A of the differential amplifier 26 is ×4, the ISO sensitivity is shifted by two steps toward higher ISO sensitivities.

In the alternative example as mentioned above, the ISO sensitivity is selected in integral multiple steps, but it can be designed to arbitrarily select the resistors R1, R2, R3, ..., Rn so that the ISO sensitivity can be selected, for example, every ⅓ step. It can also be so designed that any integral value can be selected for the gain A.

As described above, according to the embodiment and the alternative example thereof, not only is shooting made possible with the blur tolerable limit exposure time (ΔTexp) in a time division manner, but also the AMP 3 amplifies time-divided images output from the image pickup device 1 by a factor of m, so that image data with the optimum level can be obtained. Further, since a plurality of time-divided images obtained by the time-division imaging and compensated for mutual blurring are combined (added) together, combined image data compensated for blur and having improved S/N can be obtained.

Further, if an integral value in the neighborhood of the value obtained by dividing exposure time by the blur tolerable limit exposure time is m, the exposure time obtained by dividing normal shooting exposure time by m is set as the time-division exposure time, thereby enabling time-division imaging at the blur tolerable, shortest exposure time. Further, the time-division exposure time for the time-division imaging can be so set that an integral multiple of the time-division exposure time will be equal to the normal exposure time. Therefore, the image resulting from the time-division imaging is amplified by the integral multiple, so that image signals with substantially the same optimum level as in normal shooting can be obtained, thereby making the amplifier design easy.

In the embodiment and the alternative example thereof, since the CPU 7 computes and sets exposure time Texp, it can be called an exposure time computing part (or an exposure time setting part). The CPU 7 also computes time-division exposure time ΔTexp, and it can be called a time-division exposure time computing part. Further, the CPU 7 can be called an blur compensation part because it performs blur compensation or correction, an image generation part because it generates an image from which blur is removed, and an image synthesis part because it performs image synthesis. In addition, the image pickup device 1 controlled by the CPU 7 can be called a time-division imaging part because it performs time-division imaging.

The aforementioned embodiment has described an example of application of the present invention to a digital camera. As the digital camera, the present invention can be applied to a single-lens reflex digital camera or a compact digital camera, or to an electronic imaging apparatus incorporating a digital camera therein.

While there has been shown and described what is considered to be a preferred embodiment of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An electronic blur correction device comprising:
   an exposure time computing part for computing an exposure time;
   a time-division exposure time computing part for computing a time-division exposure time that is shorter than a predetermined blur tolerable limit exposure time and is 1/m of the exposure time, wherein m is an integer;
   a time-division imaging part for performing time-division imaging for the time-division exposure time plural times;
   a first amplifier part for amplifying the images captured by the time-division imaging part by a factor of m;
   a blur compensation part for compensating for mutual blurring of a plurality of the time-divided images amplified by the factor of m;
   an image synthesis part for combining the plurality of the time-divided images the mutual blurring of which are compensated for by the blur compensation part;
   an ISO sensitivity setting part for setting an ISO sensitivity; and
   a second amplifier part for amplifying an image signal generated in an image pickup device by a gain determined according to the ISO sensitivity.

2. The electronic blur correction device according to claim 1 wherein the time-division exposure time is obtained by dividing the exposure time by the integral value m, which m is either of integral values in the immediate neighborhood of a value obtained by dividing the exposure time by the blur tolerable limit exposure time.

3. The electronic blur correction device according to claim 2 wherein the integral value m is an integral value obtained by rounding up the fractional part of the divided value.

4. The electronic blur correction device according to claim 1 wherein the first amplifier and the second amplifier are combined as one unit.

5. An electronic blur correction device comprising:
   an exposure time setting part for setting an exposure time computed as the optimum exposure based on a subject brightness or an exposure time manually entered by a photographer;
   a time-division exposure time computing part for dividing the exposure time by a limit exposure time for which hand shakes are negligible and dividing the exposure time by an integral value close to the dividing result to compute a time-division exposure time;
   a time-division imaging part for performing time-division imaging for the time-division exposure time plural times;
   an image generation part for generating an image from which blur is removed based on a plurality of time-divided images captured by the time-division imaging part;
   an ISO sensitivity setting part for setting an ISO sensitivity; and
   a second amplifier part for amplifying an image signal generated in an image pickup device by a gain determined according to the ISO sensitivity.

6. The electronic blur correction device according to claim 5 wherein a value larger than the divided value is selected as the integral value from predetermined integral values.

7. The electronic blur correction device according to claim 5 wherein the image generation part obtains the blur-removed image in every period of the time-division exposure time and combines the blur-removed images.

8. The electronic blur correction device according to claim 5 wherein the first amplifier and the second amplifier are combined as one unit.

9. An electronic blur correction device comprising:
   an exposure time setting part for setting an exposure time computed as an optimum exposure based on a subject brightness or an exposure time manually entered by a photographer;
   a time-division exposure time computing part for computing a time-division exposure time that is shorter than a predetermined blur tolerable limit exposure time and is 1/m of the exposure time, wherein m is an integer;
   a time-division imaging part for performing time-division imaging for the time-division exposure time plural times;
   a first amplifier part for amplifying an image captured by the time-division imaging part by a factor of m;
   an image generation part for generating an image from which blur is removed based on the plurality of time-divided images amplified by the factor of m;
   an ISO sensitivity setting part for setting an ISO sensitivity; and
   a second amplifier part for amplifying an image signal generated in an image pickup device by again determined according to the ISO sensitivity.

10. An electronic blur correction method comprising:
    computing a proper exposure time;
    computing a time-division exposure time by dividing the exposure time by an integer m, the time-division exposure time being shorter than a blur tolerable limit exposure time;
    performing time-division imaging for the time-division exposure time plural times;
    amplifying, with a first amplifying part, image signals obtained by the time-division imaging by a factor of m to obtain a plurality of image signals amplified by the factor of m;
    using the plurality of image signals amplified by the factor of m to generate an image for which blur is corrected;
    setting an ISO sensitivity; and
    amplifying, with a second amplifying part, an image signal generated in an image pickup device by a gain determined according to the ISO sensitivity.

* * * * *